(12) United States Patent
Shukla

(10) Patent No.: US 12,592,603 B2
(45) Date of Patent: *Mar. 31, 2026

(54) BEARING CONFIGURATION FOR AN ELECTRONIC MOTOR

(71) Applicant: Skydio, Inc., San Mateo, CA (US)

(72) Inventor: Himay Rashmikant Shukla, San Mateo, CA (US)

(73) Assignee: Skydio, Inc., San Mateo, CA (US)

( * ) Notice: Subject to any disclaimer, the term of this patent is extended or adjusted under 35 U.S.C. 154(b) by 328 days.

This patent is subject to a terminal disclaimer.

(21) Appl. No.: 18/178,238

(22) Filed: Mar. 3, 2023

(65) Prior Publication Data

US 2023/0208245 A1     Jun. 29, 2023

Related U.S. Application Data

(63) Continuation of application No. 17/101,489, filed on Nov. 23, 2020, now Pat. No. 11,605,998, which is a (Continued)

(51) Int. Cl.
B64U 10/14         (2023.01)
B64U 20/87         (2023.01)
(Continued)

(52) U.S. Cl.
CPC ........... *H02K 5/1737* (2013.01); *B64U 10/14* (2023.01); *B64U 20/87* (2023.01); *B64U 50/19* (2023.01); *F16C 19/04* (2013.01); *F16C 19/08* (2013.01); *F16C 19/24* (2013.01); *F16C 19/28* (2013.01); *F16C 19/505* (2013.01);

*F16C 19/56* (2013.01); *F16M 11/10* (2013.01); *F16M 11/18* (2013.01); *F16M 11/2071* (2013.01);
(Continued)

(58) Field of Classification Search
CPC .. H02K 5/00; H02K 5/16; H02K 5/17; H02K 5/173; H02K 5/1732; H02K 5/1737; H02K 5/24; H02K 7/00; H02K 7/06; H02K 7/08; H02K 7/081; H02K 7/085; H02K 7/088; H02K 7/10; H02K 7/11; H02K 7/14; F16C 19/00; F16C 19/04; F16C 19/08; F16C 19/24; F16C 19/28; F16C 19/50; F16C 19/505; G11B 19/2009; B64C 27/00; B64C 27/08; B64C 27/50; B64C 39/02; B64C 39/024; B64D 47/08; G06V 20/00; G06V 20/13; G04R 20/00; G04R 20/02; G07C 5/00; G07C 5/08; G07C 5/085

See application file for complete search history.

(56) References Cited

U.S. PATENT DOCUMENTS 5,463,490 A     10/1995  Seto
5,793,132 A      8/1998  Hirose
(Continued)

*Primary Examiner* — Tran N Nguyen
(74) *Attorney, Agent, or Firm* — Young Basile Hanlon & MacFarlane, P.C.

(57)                    ABSTRACT

A motor including a rotor, a first arm, a mount, a stator, a first bearing, and a second bearing. The motor is configured to rotate the rotor. The mount connected to the first arm. The stator coupled to the mount. The first bearing located between and connecting the rotor to the stator. The second bearing located between and connecting the rotor to the mount. The first arm prevents movement of the stator and the mount.

20 Claims, 8 Drawing Sheets

Related U.S. Application Data continuation of application No. 15/898,177, filed on Feb. 15, 2018, now Pat. No. 10,879,757.

(60) Provisional application No. 62/555,592, filed on Sep. 7, 2017.

(51) Int. Cl.

| | |
|---|---|
| *B64U 50/19* | (2023.01) |
| *F16C 19/04* | (2006.01) |
| *F16C 19/08* | (2006.01) |
| *F16C 19/24* | (2006.01) |
| *F16C 19/28* | (2006.01) |
| *F16C 19/50* | (2006.01) |
| *F16C 19/56* | (2006.01) |
| *F16M 11/10* | (2006.01) |
| *F16M 11/18* | (2006.01) |
| *F16M 11/20* | (2006.01) |
| *F16M 13/02* | (2006.01) |
| *H02K 5/173* | (2006.01) |
| *H02K 5/24* | (2006.01) |
| *H02K 7/08* | (2006.01) |
| *H02K 7/14* | (2006.01) |
| *B64U 101/30* | (2023.01) |
| *F16C 33/36* | (2006.01) |
| *F16M 11/12* | (2006.01) |

(52) U.S. Cl.

CPC .............. *F16M 13/02* (2013.01); *H02K 5/24* (2013.01); *H02K 7/088* (2013.01); *H02K 7/14* (2013.01); *B64U 2101/30* (2023.01); *F16C 33/36* (2013.01); *F16C 33/366* (2013.01); *F16C 2326/43* (2013.01); *F16C 2380/26* (2013.01); *F16M 11/121* (2013.01); *F16M 2200/041* (2013.01); *F16M 2200/044* (2013.01)

(56) References Cited

U.S. PATENT DOCUMENTS

| | | | | |
|---|---|---|---|---|
| 5,821,647 | A | 10/1998 | Takehara | |
| 6,762,527 | B1 | 7/2004 | Horng | |
| 8,294,311 | B2 | 10/2012 | Miyoshi | |
| 9,643,718 | B1 | 5/2017 | Beckman | |
| 10,065,737 | B2 * | 9/2018 | Keennon | B64C 33/02 |
| 10,371,812 | B2 * | 8/2019 | Pesik | G01S 7/032 |
| 10,879,757 | B2 | 12/2020 | Shukla | |
| 2006/0210207 | A1 | 9/2006 | Umeda | |
| 2013/0323094 | A1 | 12/2013 | Jang | |
| 2016/0144954 | A1 | 5/2016 | Daigle | |
| 2016/0211720 | A1 | 7/2016 | Koegler | |
| 2019/0074747 | A1 | 3/2019 | Shukla | |
| 2021/0175770 | A1 | 6/2021 | Shukla | |

* cited by examiner

Screw 160

Mount 150

Rotor 140

First Motor Shell 110

172

First Bearing 170A

Second Bearing 170B

Rotor Screw 145

172

Second Motor Shell 120

Motor 100

Stator 130

First Arm Segment 180

BEARING CONFIGURATION FOR AN ELECTRONIC MOTOR

CROSS REFERENCE TO RELATED APPLICATIONS

This application is a continuation of U.S. application Ser. No. 17/101,489, filed on Nov. 23, 2020, which claims priority to U.S. application Ser. No. 15/898,177, filed Feb. 15, 2018, which claims the benefit of U.S. Provisional Application No. 62/555,592, filed Sep. 7, 2017, both of which are incorporated by reference in their entirety.

TECHNICAL FIELD

The disclosure generally relates to the field of electronic motors and in particular to bearing configurations in an electronic motor.

BACKGROUND

Rotational electronic motors (i.e., a motor that drives a rotor to rotate about a single axis) are used in a large variety of applications. In an electronic motor, an armature drives a rotor encircled by a stator. To minimize friction, the rotor is coupled to the stator and/or other elements of the motor with multiple bearings (e.g., rolling-element bearings) which allows the rotor to rotate about its axis. Bearings generally constrain the rotor from moving in directions other than rotating about the rotational axis of the motor by bearing axial loads and/or radial loads.

One such application for electronic motors is in an electronic gimbal that actively stabilizes the orientation and/or position of a mounted object (e.g., a camera). Gimbals often include three motors, each to control the orientation of the mounted object along a respective axis of three-dimensional space. However, gimbals with more or fewer motors that three also are used. In a conventional motor of a gimbal, three bearings couple to the rotor.

Conventional motors in gimbals generally have two bearings inside the motor and a third bearing outside of the motor. Often, each of the bearings are of similar size. The third bearing outside the motor connects to the other gimbal arm which is not connected to the motor. Thus, conventional designs have a load path that is supported by two bearings, one in motor and one in gimbal arm.

SUMMARY

A motor including a rotor, a first arm, a mount, a stator, a first bearing, and a second bearing. The motor is configured to rotate the rotor. A fixed component comprising a mount and a stator. The mount connected to the first arm. The stator coupled to the mount. The first bearing located between and connecting the rotor to the stator. The second bearing located between and connecting the rotor to the mount. The fixed component mutually couples the stator, the mount, the first bearing, and the second bearing to the first arm.

A motor including: a rotor, a mount, a first arm, a stator, a first bearing, and a second bearing. The motor configured to rotate the rotor. A fixed component comprising a mount and a stator. The first arm is connected to the mount. The stator connected to the mount. The first bearing including: a first inner race in communication with the rotor, a first outer race in communication with the stator, and a first plurality of rolling elements located between the first inner race and the first outer race. The second bearing including: a second inner race in communication with the rotor, a second outer race in communication with the mount, and a second plurality of rolling elements located between the second inner race and the second outer race. The fixed component is coupled to the first arm.

A motor including a first motor shell, a second motor shell, a rotor, a first arm, a mount, a stator, a first bearing, and a second bearing. The first motor shell and the second motor shell form an interior cavity. A fixed component comprising a mount, a stator, and one or more screws. The rotor is configured to be a rotational part of the motor. The first arm including a portion that extends into the interior cavity. The mount is located within the interior cavity and connected to the portion of the first arm that extends into the interior cavity. The stator is coupled to the mount. One or more screws connecting the first motor shell to the mount. The first bearing is located between and connecting the rotor to the stator. The second bearing located between and connecting the rotor to the mount. The fixed component is coupled to the first arm.

BRIEF DESCRIPTION OF THE DRAWINGS

The disclosed embodiments have advantages and features which will be more readily apparent from the detailed description, the appended claims, and the accompanying figures (or drawings). A brief introduction of the figures (FIGS.) is below.

DETAILED DESCRIPTION

Figure 1A:
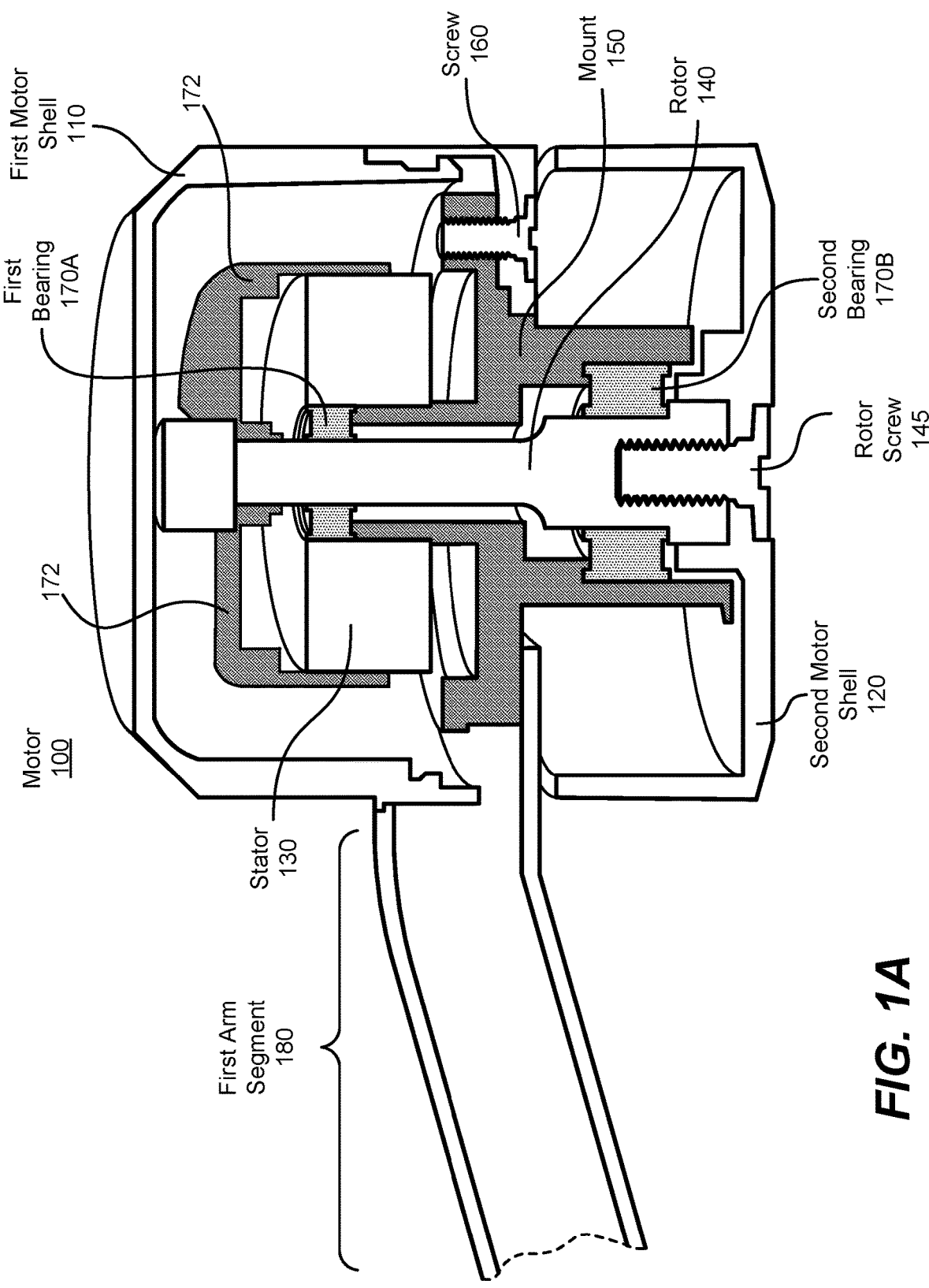
FIG. 1A illustrates a cross-sectional view of a motor with two bearings, in accordance with an example embodiment.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed, by way of example embodiments, is a motor with two bearings. Compared to a conventional motor with three bearings, the two-bearing motor may be cheaper to manufacture. The two-bearing motor also may be more reliable (e.g., may be less prone to mechanical breakdown) due to decreased mechanical complexity.

Different types and sizes of bearings differ in the loads which they can effectively bear. Overloading a bearing may cause the bearing to function sub-optimally (e.g., the load may increase the internal friction of the bearing to an unacceptable degree), shorten the lifetime of the bearing, and/or cause the bearing to undergo mechanical breakdown. The mechanical failure of just one bearing may significantly increase the internal friction of the motor. Internal friction may harm the performance of the motor by, for example, increasing power usage, causing the motor to overheat, slowing the response for the motor, shortening the lifetime of the motor by putting additional strain on other components, and/or decreasing the precision of the motor. Also, mechanical failure of a bearing may cause the elements of the motor to become misaligned, which may cause further damage to the motor as the motor continues to operate. Under some conditions, mechanical failure of a single bearing may make the motor and, by extension, the entire gimbal inoperable. Accordingly, the motor may be designed so that its bearings are not overloaded.

The two-bearing motor may be more reliable (e.g., less likely to undergo mechanical failure or have a longer average lifespan) than a conventional three-bearing motor. This can be because the combined failure rate of all three bearings in the three-bearing motor may be higher than the failure rate of the two bearings of the two-bearing motor. Thus, even in some cases where the individual bearings of the two-bearing motor have higher chances of mechanical failure than the individual bearings of a conventional three-bearing motor, the motor with the two-bearing motor may still be more reliable than the conventional three-bearing motor.

The two-bearing motor is structured so that, when loaded, the majority of the load (e.g., a radial load) is borne by one of the bearings. The bearing that bears a greater load may be larger and, thus, better suited for a heavy load. In some embodiments, the larger bearing may include rolling elements that have respective radii larger than respective radii of rolling elements of the other bearing by a ratio of at least 1.5 (150%). In some embodiments, the larger bearing may have an outer race with a radius that is greater than a radius of the outer race of the smaller bearing by a ratio of at least 1.5.

In some embodiments, the motor includes three bearings. The motor may include two smaller bearings and one larger bearing, where the larger bearing is the closest bearing to the load of the motor. The third bearing may reduce vibration in the motor. In some embodiments, the addition of the third bearing decreases the length of standing waves on the rotor of the motor, thereby increasing the frequency of the fundamental harmonic of the motor.

Example Aerial Vehicle Configuration

FIG. 1A illustrates a cross-sectional view of a motor with two bearings, in accordance with an example embodiment.

The motor 100 may be a brushless electronic motor with a rotating component and a fixed component. The fixed component of the motor 100 may include a first motor shell 110, a stator 130, one or more screws 160, and a mount 150. The elements of the fixed component may be mutually coupled together so as to rotate together as a single rigid (or approximately rigid) element. The rotating component of the motor 100 may include a rotor 140, a rotor screw 145, and a second motor shell 120. The elements of the rotating component may also be mutually coupled together, and the rotating component and the fixed component may rotate relative to each other along an axis of rotation. A first bearing 170A and a second bearing 170B may couple the rotating component to the fixed component and allow the rotating component to rotate relative to the fixed component.

The first motor shell 110 and the second motor shell 120 enclose or partially enclose elements of the motor 100 including the stator 130, the first bearing 170A, the second bearings 170B, and at least a portion of the rotor 140. The first motor shell 110 and second motor shell 120 may be, for example, plastic, metal, or ceramic. The first motor shell 110 and second motor shell 120 may together form a seal or a partial seal to prevent particles (e.g., dust or sand) or liquids from entering the internal components of the motor 100. The outer surfaces of the first motor shell 110 and the second motor shell 120 may be approximately flush.

The stator 130 and the rotor 140 interoperate together as a rotary system to rotate the rotor 140. The stator 130 may be stationary and the rotor 140 may rotate when power is supplied to the motor 100. One of the stator 130 and the rotor 140 may be an armature of the motor 100 and the other may be a field magnet. The stator 130, the rotor 140, or both may include one or more electromagnets and/or one or more permanent magnets. Electric power (e.g., direct current (DC) power, single-phase alternating current (AC) power, or three-phase power) may be supplied to the armature of the motor 100 to rotate the rotor 140.

The rotor 140 is driven to rotate the rest of the rotating component of the motor 100. The rotor 140 may couple to the rotating component (e.g., to the second motor shell 120) with a mechanical fastener, such as the rotor screw 145 illustrated in FIG. 1A. The rotor screw 145 may rotationally couple the rotor 140 to the second motor shell 120. In some embodiments, the rotor 140 and the rotating component (e.g., the second motor shell 120) may be coupled together with one or more alternate mechanical fasteners (e.g., screws, bolts, nails, staples, or pins). Also, instead of or in addition to mechanical fasteners, the rotor 140 and the second motor shell 120 may be coupled together with another coupling means, such as an adhesive (e.g., liquid adhesive, resins, acid-based cements, adhesive tape, or some combination thereof) or thermal bonding (e.g., welding).

The mount 150 may be a rigid element that couples various elements of the motor 100 together. The mount 150 may couple to the stator 130, the first bearing 170A, the second bearing 170B, and the first motor shell 110. The mount 150 may be composed of a rigid material, such as a plastic with a high Young's modulus.

The one or more screws 160 (one of which is illustrated in FIG. 1A) couple the first motor shell 110 to the mount 150. Instead of or in addition to the one or more screws 160, the first motor shell 110 may be coupled to the mount 150 with alternate mechanical fasteners, adhesive, or thermal bonding.

The first bearing 170A and the second bearing 170B (referred to herein collectively as "bearings 170") are rotational bearings that allow the rotating component of the motor 100 to rotate relative to the fixed component. The second bearing 170B may be larger than the first bearing 170A and may be rated for a larger load. The bearings 170 may be rolling-element bearings, such as ball bearings (e.g., a deep-groove radial ball bearing) or roller bearings (e.g., cylindrical roller bearings, spherical roller bearings, needle roller bearings, tapered roller bearings, gear bearings, or toroidal bearings). In some embodiments, the first bearing 170A is a different type of bearing than the second bearing 170B. For example, one of the bearings 170 (e.g., the second bearing 170B) may be a bearing that locates axially (e.g., a deep-groove radial ball bearing) and the other bearing 170 (e.g., the first bearing 170A) may be a bearing that does not locate axially (e.g., a cylindrical roller bearing).

The motor 100 may include additional elements not illustrated in FIG. 1A. For example, the motor 100 may detect the position (angle) of the rotor 140 with an electro-mechanical position detection device, such as a rotary encoder (e.g., an absolute encoder and/or an incremental encoder), a magnetic encoder, or a resistive potentiometer. The position detection device may output a digital or analog signal that indicates the position of the rotor 140.

The motor 100 also may include circuitry for receiving instructions and for controlling and driving the motor 100. This circuitry may be embodied on one or more integrated circuits (ICs). The instructions may be received from external control logic (e.g., transmitted by a wire). The instructions may, for example, establish a setpoint for the position of the rotor 140. The circuitry for controlling the motor 100 may include a proportional-integral-differential (PID) controller or a proportional-summation-difference (PSD) controller that controls the position of the rotor 140 based on the output of the position detection device. The circuitry for driving the motor 100 may provide power to the armature of the motor 100 based on the output of the control circuitry. In addition, an end bell (or motor magnet holder) 172 couples a shaft with a magnetic ring, while mount 150 couples with the stator. When energized, the motor and stator rotate to operate the motor 100.

The motor 100 illustrated in FIG. 1A may be part of a gimbal. In alternate embodiments, the motor 100 may be part of other motor movement systems. The fixed component of the motor 100 may couple to a base object, such as the first arm segment 180 (e.g., the first arm segment 180 has a portion that extends into an interior cavity of the motor shell (e.g., 110, 120) to connect to the fixed components (e.g., mount 150)) and elements coupled thereto (e.g., an aerial vehicle to which the gimbal couples). The rotating component of the motor 100 may couple to a rotating load object, such as, a second arm segment (not illustrated in FIG. 1A) of the gimbal and elements coupled thereto (e.g., a camera coupled to the gimbal). A force on the rotating load object (e.g., gravity, wind, or any other force) is distributed through the motor 100 into the base object. Forces on the rotating load object, thus produce a load on the motor 100.

The motor 100 may be subject to axial loads (e.g., a load in the direction of the axis of the rotor 140) and radial loads (e.g., a load perpendicular to the axis of the rotor 140). A radial load may result from forces (e.g., gravity) on the rotating load object coupled to the rotor 140 and from the inertia of the rotating load object when the base object undergoes angular or linear acceleration. The radial load is transferred from the rotor 140 to the rotating component of the motor 100 through the bearings 170 and through the mount 150. A radial load on the motor 100 thus produces a load on the bearings 170. The geometry of the motor 100 may be such that the load on the second bearing 170B from a radial load is significantly greater than the load on the first bearing 170A. Because it is not required to bear as great of a load, the first bearing 170A may be smaller than the second bearing 170B.

Figure 1B:
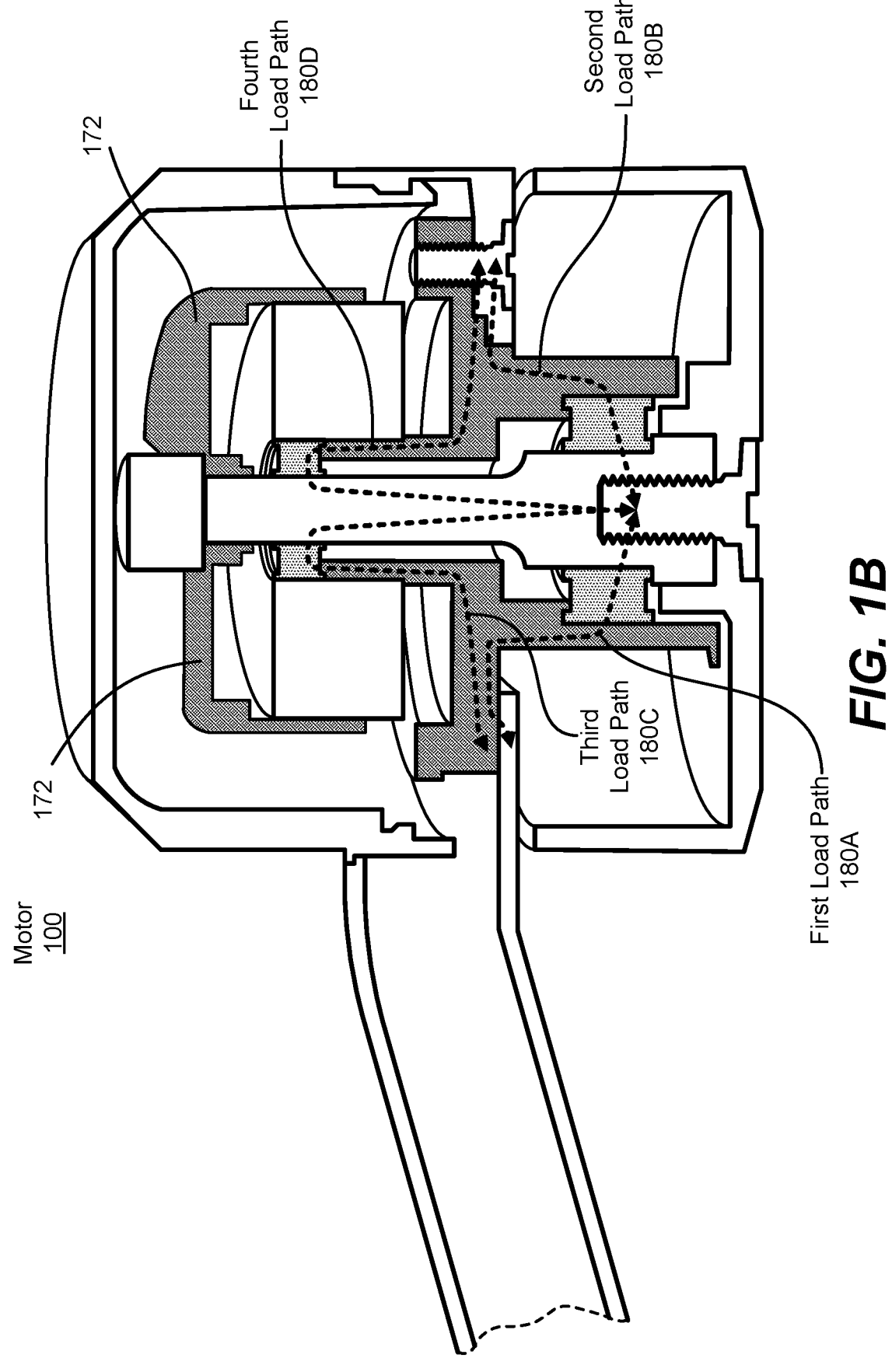
FIG. 1B is a cross-sectional view of an example of a motor with two bearings illustrating load paths through the bearings, in accordance with an example embodiment.

FIG. 1B is a cross-sectional view of an example of a motor 100 with two bearings illustrating load paths through the bearings, in accordance with an example embodiment. FIG. 1B illustrates four load paths through the motor 100 corresponding to a radial load on the rotor 140: the first load path 190A, the second load path 190B, third load path 190C, and the fourth load path 190D (collectively referred to herein as "load paths 190"). A load path 190 is a path through elements that bear a load. The load path 190 represents the transfer of mechanical stress between elements in the motor 100. Each of the load paths 190 shown in FIG. 1B illustrates mechanical stress being distributed from the rotor screw 145 into the fixed component of the motor 100 through either the first bearing 170A or the second bearing 170B.

The motor 100 may be configured so that the stator 130 and the first bearing 170A are "floating" with respect to the rest of the fixed component of the motor 100. That is, in some embodiments, the first bearing 170A and the stator 130 do not connect to any component of the motor 100 other than the mount 150 and the path from the first bearing 170A and the stator 130 through the mount 150 to the rest of the fixed component of the motor 100 is relatively indirect.

Thus, load paths 190 that pass through the second bearing 170B (e.g., the first load path 190A and the second load path 190B) are shorter than the load paths 190 that pass through the first bearing 170A (e.g., the third load path 190A and the fourth load path 190B). Because the load paths 190 that pass through the second bearing 170B are shorter than the load paths 190 that pass through the first bearing 170A, when the two bearings 170 are loaded equally, the resultant strain (i.e., deformation) on the mount 150 is smaller along the paths through the second bearing 170B (e.g., along the first load path 190A and the second load path 190B) than along the paths through the first bearing 170A. As a consequence, the load borne by the first bearing 170A is significantly less than that borne by the second bearing 170B.

Figure 1C:
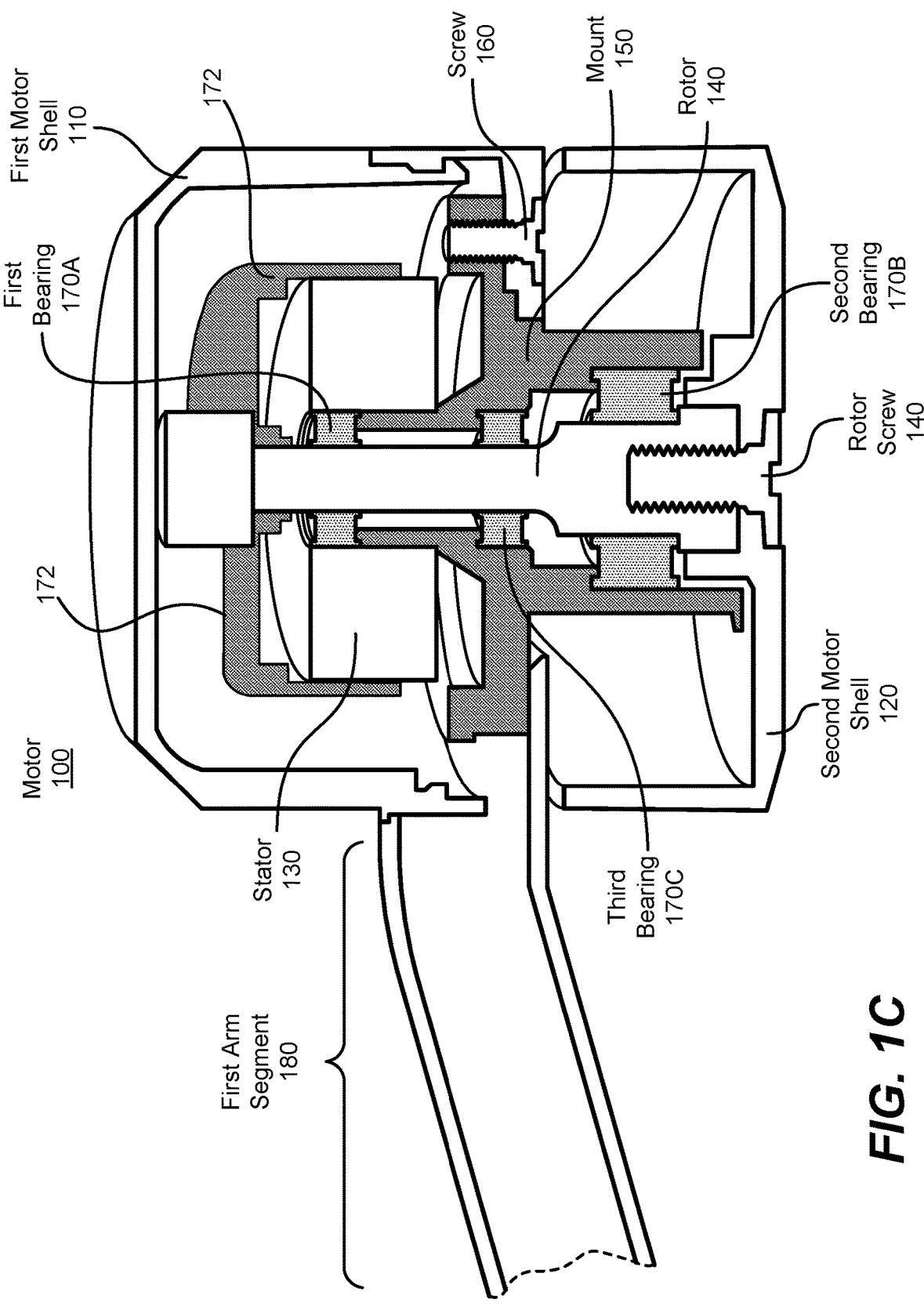
FIG. 1C illustrates a cross-sectional view of a motor of a motor with three bearings, in accordance with an example embodiment.

FIG. 1C illustrates a cross-sectional view of a motor with three bearings, in accordance with an example embodiment. The motor 100 shown in FIG. 1C may be configured similarly to the motor 100 of FIG. 1A. The first bearing 170A and the second bearing 170B of the motor 100 illustrated in FIG. 1A may correspond to the first bearing 170A and the second bearing 170B of the motor 100 in FIG. 1C. However, the motor 100 of FIG. 1C also includes an additional third bearing 170C.

The third bearing 170C may be located in between the first bearing 170B and the second bearing 170B. Like the first bearing 170A and the second bearing 170B, the third bearing may encircle the rotor 140 and couple the rotor 140 to the mount 150. The third bearing 170C may be similar in size to the first bearing 170A and may be smaller than the second bearing 170B. The third bearing 170C may bear less load than the second bearing 170B. The third bearing 170C may reduce vibration in the motor 100. In some embodiments, the addition of the third bearing 170C decreases the length of standing waves on the rotor 140, thereby increasing the frequency of the fundamental harmonic of the motor 100. This configuration also may provide a stiffer joint, which may help with control systems.

Figures 2A, 2B:
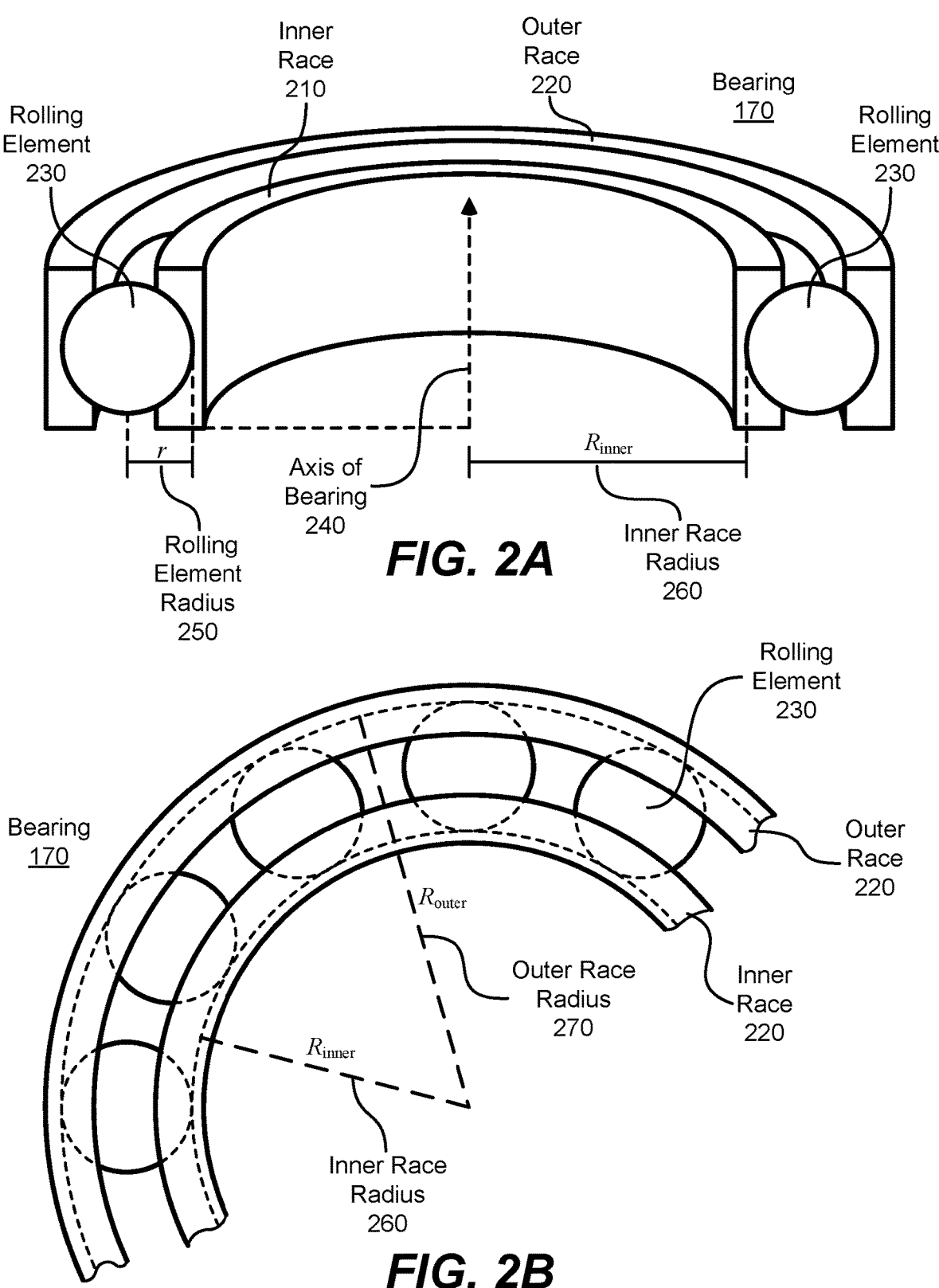
FIG. 2A-2B illustrates a rolling-element bearing, in accordance with an example embodiment.

FIGS. 2A and 2B illustrate a bearing 170, in accordance with an example embodiment. FIG. 2A illustrates a cross-sectional view of the bearing 170 and FIG. 2B illustrates a portion of the bearing 170 from a view along the axis of the bearing 170. The bearing 170 includes an inner race 210, an outer race 220, and multiple rolling elements 230.

The inner race 210 encircles and couples to the rotor 140 of the motor 100 and the outer race 220 couples to the mount 150 and/or the stator 130. The inner race 210 and outer race 220 may be composed, partially or entirely, of metal (e.g., stainless steel or chrome steel) or ceramic (e.g., silicon nitride). The inner race 210 and outer race 220 may include respective grooves which the rolling elements 230 traverse. The inner race 210 and the outer race 220 may be concentric and may rotate with respect to each other.

The rolling elements 230 illustrated in FIGS. 2A and 2B may be spherical balls. In alternate embodiments, the rolling elements 230 may be ellipsoidal elements, cylindrical elements, tapered rollers, needle rollers, or elements of another shape that is approximately symmetric about an axis rotation. The rolling elements 230 may be composed, partially or entirely, of metal (e.g., stainless steel or chrome steel), ceramic (e.g., silicon nitride or aluminum oxide), plastic (e.g., polyoxymethylene, polyvinyl chloride, or Nylon), or any other suitable material. The rolling elements 230 may have a smooth texture where reduced friction is desired. If for any reason friction is desired, the rolling elements 230 may have a rougher texture.

In some embodiments, the bearing 170 may include a cage that maintains the distance between each of the rolling elements 230. The cage may reduce friction in the bearing 170 by preventing the rolling elements from coming into contact with one another. The bearing 170 may also include lubricant to further reduce friction. The embodiment of the bearing 170 illustrated in FIGS. 2A and 2B is a single-row ball bearing, but in alternate embodiments the bearing 170 may include multiple rows. That is, the bearing 170 may include two or more grooves on the inner race 210, a respective groove on the outer race 210 for each of the grooves of the inner race 210, and a set of rolling elements 230 corresponding to each pair of grooves.

FIGS. 2A and 2B illustrate the axis of the bearing 240. The axis of the bearing 240 is the axis of rotation for the rotor 140 and may be the axis of the inner race 210 and of the outer race 220. The rolling elements 230 may lie in a plane orthogonal to the axis of the bearing 240. Each of the rolling elements 230 may be equidistant from the axis of the bearing 240.

Herein, the inner race radius 260 may refer to the minimum distance between the surface of the inner race 210 that a rolling element 230 is in contact with and the axis of the bearing 240. For example, in the embodiment illustrated in FIG. 2A, the inner race radius 260 is the distance between the trough of the groove of the inner race 210 and the axis of the bearing 240.

The rolling element radius 250 denotes half of the largest extension of a rolling element 230 perpendicular to the axis about which it rolls. For example, if a bearing 170 is a ball bearing or cylindrical roller bearing, the rolling element radius 250 is simply the radius of one of the rolling elements 230 (e.g., the radius of the ball bearings or the radius of the cylindrical rolling elements). As another example, if the bearing 170 is a toroidal bearing, the rolling element radius 250 is the radius of the largest circular cross section of the rolling elements 230.

The outer race radius 270 refers to the maximum length of a distance vector between the surface of the outer race 220 that a rolling element 230 is in contact with and the axis of the bearing 240, where the vector is perpendicular to the axis of the bearing. For example, in a ball bearing with grooves, as illustrated in FIGS. 2A-2B, the outer race radius 270 may be the trough of the groove of the outer race 220. The outer race radius 270 may be slightly longer than the sum of the inner race radius 260 and the diameter of the rolling elements 230 (i.e., twice the rolling element radius 250).

Returning now to FIG. 1A, the first bearing 170A may be smaller than the second bearing 170B. The rolling elements 230 of the second bearing 170B may have respective radii larger than the respective radii of the rolling elements 230 of the first bearing 170A by a ratio of at least 1.5 (150%). Also, the radius of the outer race 220 of the second bearing 170B may be greater than the radius of the outer race 220 of the first bearing 170A by a ratio of at least 1.5.

Because the second bearing 170B is larger than the first bearing 170A, the second bearing 170B may be capable of bearing a greater load than the first bearing 170A. Thus, the motor 100 may be structured so that the majority of the load is borne by the second bearing 170B, without being unacceptably prone to bearing failure.

Returning now to FIG. 1C, the third bearing 170C may be smaller than second bearing 170B and of similar size to the first bearing 170A. The third bearing 170C may include rolling elements 230, and the respective radii of the rolling elements 230 of the second bearing 170B may be larger than respective radii of the rolling elements 230 of the third bearing 170C by a ratio of 1.5 or more. The rolling elements 230 of the third bearing 170C may be of similar size to the rolling elements 230 of the first bearing 170A. For example, the radii of the rolling elements 230 third bearing 170C and the radii of the radii of the rolling elements 230 first bearing 170A may differ by a factor of 0.1 or less. In some embodiments, the outer race radius 270 of the second bearing 170B is greater than the outer race radius 270 of the third bearing 170C by a ratio of at least 1.5. The outer race radii 270 of the first bearing 170A and the third bearing 170C may differ by a factor of 0.1 or less.

Example Gimbal

Figure 3A:
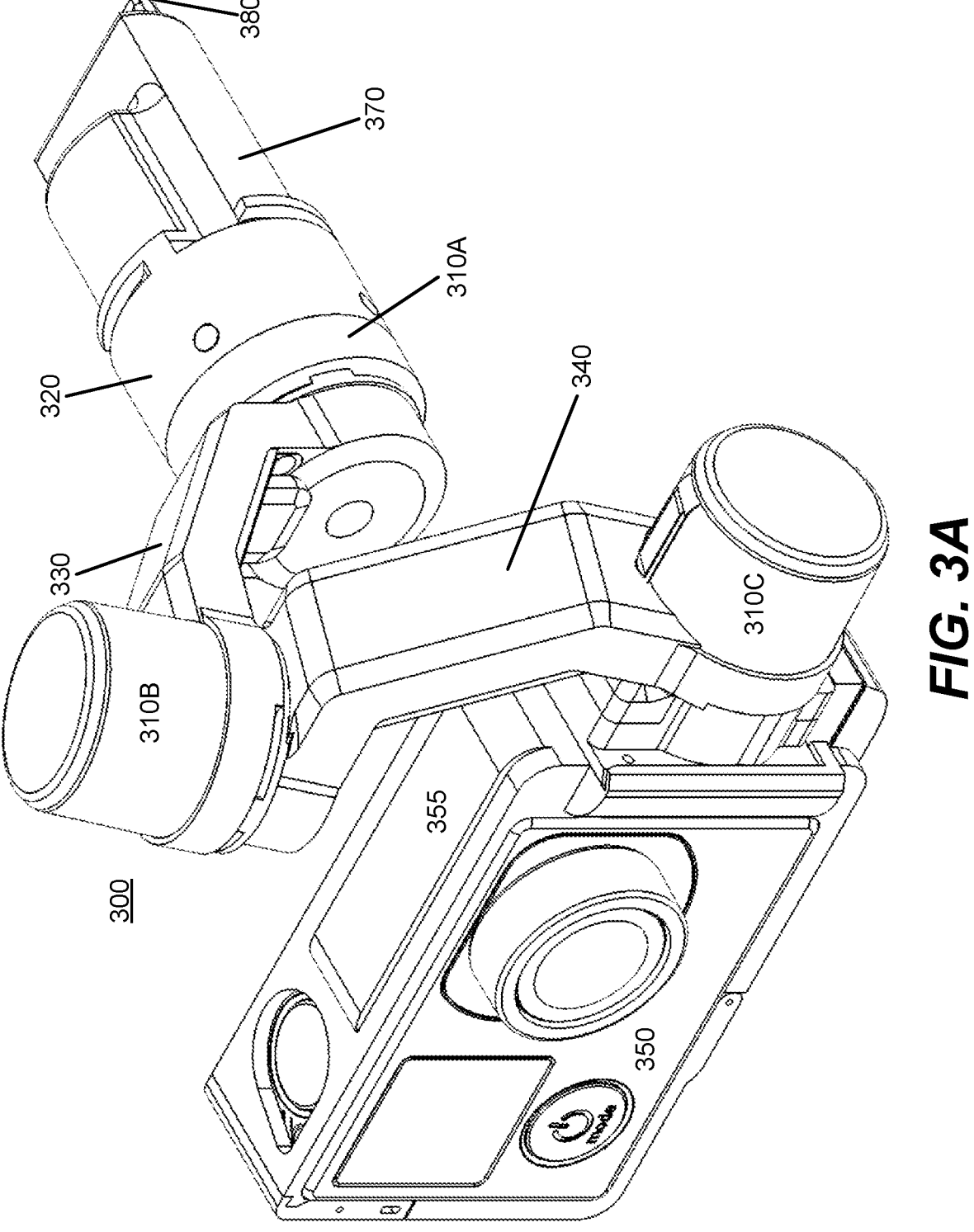
FIGS. 3A-3B illustrate a gimbal coupled to a camera in a camera frame, in accordance with some example embodiments.
Figure 3B:
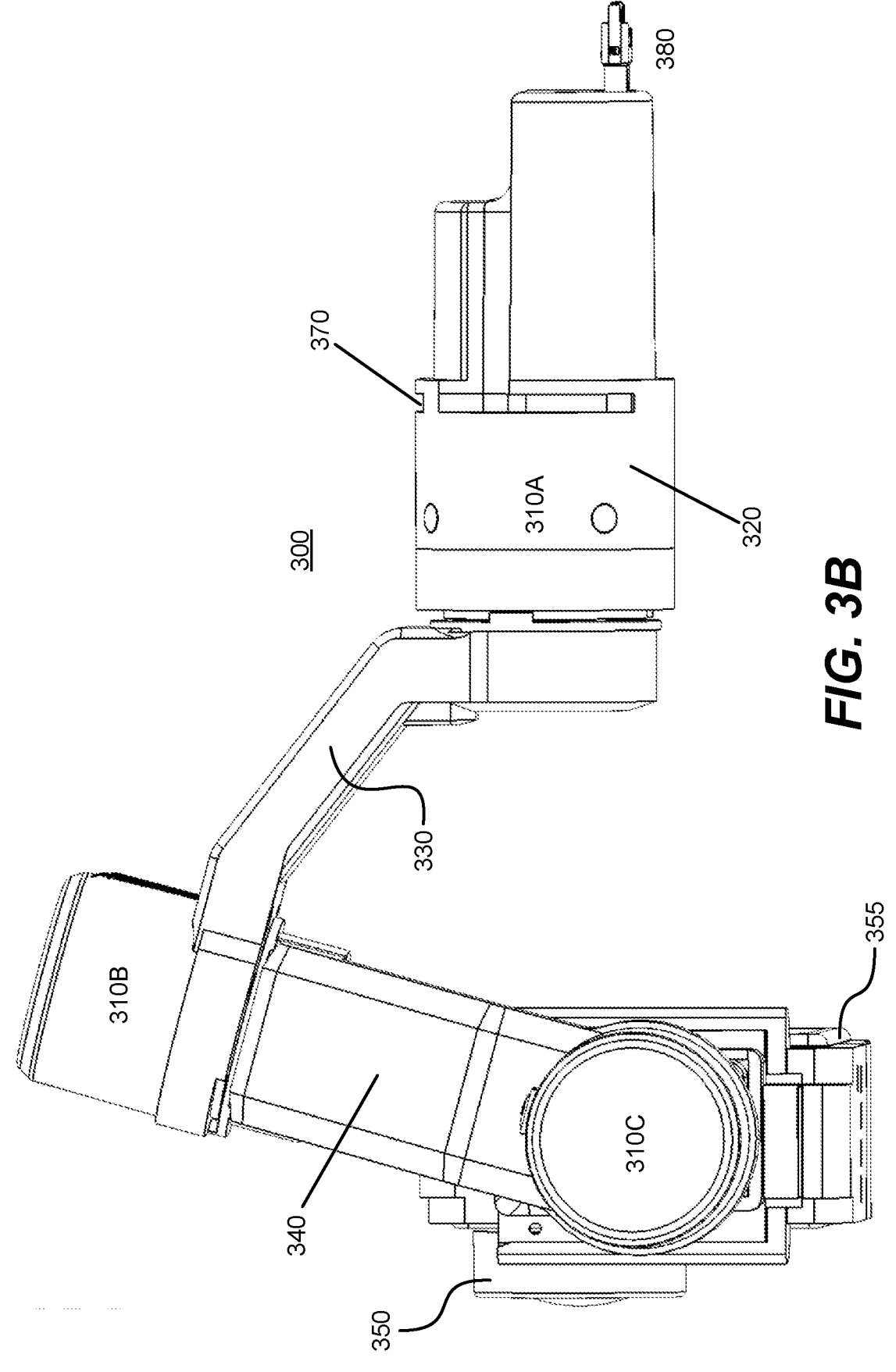

FIGS. 3A and 3B illustrate an example embodiment of a gimbal 300 attached to a camera frame 355, which itself is attached to a camera 350. The example gimbal 300 includes a base arm 320, a middle arm 330, a mount arm 340, a first motor 310A, a second motor 310B, and a third motor 310C. The first motor 310A, the second motor 310B, and the third motor 310C are collectively referred to herein as motors 310. Some or all of the motors 310 may be structured like the motors 100 illustrated in FIG. 1A and/or 1C.

The base arm 320 may include a mechanical attachment portion 370 at a first end of the base arm 320 that allows the gimbal 300 to securely attach to a reciprocal component on a mount platform (e.g., an aerial vehicle, a ground vehicle, or a handheld grip), and also be removable. The base arm 320, the middle arm 330, and the mount arm 340 may include the first motor 310A, the second motor 310B, and the third motor 310C, respectively. The first motor 310A may be at a second end of the base arm 320 and may couple to the first end of the middle arm 330. Similarly, the second motor 310B may be at a second end of the middle arm 330 and may couple to the first end of the mount arm 330. The second end of the mount arm 330 includes the third motor 310C which may removably couple to the camera frame 355. The camera frame 355 may removably couple to (e.g., partially enclose) the camera 350.

The gimbal 300 may be configured to allow for rotation of a mounted object in space. In the embodiment depicted in FIGS. 3A and 3B, the mounted object is a camera 350 to which the gimbal 300 is mechanically coupled. The gimbal 300 may allow for the camera 350 to maintain a particular orientation in space so that it remains relatively steady as the mount platform to which it is attached moves (e.g., as an aerial vehicle tilts or turns during flight). The gimbal 300 may have three motors 310, each of which rotates the mounted object (e.g., the camera 350) about a specific axis of rotation. Herein, for ease of discussion, the motors 310 are numbered by their proximity to the mount platform (i.e., the first motor 310A, the second motor 310B, and the third motor 310C).

The gimbal 300 may include a gimbal control system that controls the orientations of each of the motors 310. In some embodiments, the gimbal control system is part of a mount platform to which the gimbal 300 couples. In some embodiments, the gimbal control system may include interoperating components on both the mount platform and the gimbal 300.

A sensor system of the gimbal 300 may detect the current orientation of the mounted with a sensor unit that may include rotary encoders for the motors 310, an inertial measurement unit (IMU), a digital compass, or some combination thereof. After detecting the current orientation of the mounted object, via a sensor unit, the gimbal control system may determine a preferred orientation along each of the three axes of rotation (e.g., yaw, pitch, and roll). The preferred orientation may be used by the gimbal control system to compute a rotation for each motor 310 in order to move the camera 350 to the preferred orientation or keep the camera 350 in the preferred orientation.

The axis to which each motor 310 corresponds may depend on the mount platform to which the gimbal 300 is attached. For example, when attached to an aerial vehicle, the first motor 310A may rotate the mounted object about the roll axis, the second motor 310B may rotate corresponding to rotation in yaw, and the third motor 310C may correspond to rotation in pitch. However, when the same gimbal 300 is attached to a handheld grip, the motors 310 may correspond to different axes: for example, the first motor 310A corresponds to yaw, and the second motor 310B corresponds to roll, while the third motor 310C still corresponds to pitch.

In one embodiment, each of the three motors 310 is associated with an orthogonal axis of rotation. However, in some embodiments, such as the embodiment depicted in FIG. 3A and FIG. 3B the motors 310 of the gimbal 300 are not orthogonal. A gimbal 300 in which the motors 310 are not orthogonal may have at least one motor 310 that rotates the mounted object about an axis which is not orthogonal to the axis of rotation of the other motors 310. A non-orthogonal motor 310 configuration of the gimbal 300 may allow for a larger range of unobstructed viewing angles for the camera 350. For example, in the embodiment shown in FIGS. 3A and 3B, the pitch of the camera 350 relative to the connection of the gimbal 300 to the mount platform (e.g., an aerial vehicle) can be about 16° higher without the field of view of the camera 350 being obstructed (i.e., without the second motor 310B appearing in the image captured by the camera 350) than it could with an orthogonal motor configuration. In some embodiments, the second motor 310B is not identical to the other two motors 310A, 310C. The second motor 310B may be capable of producing a higher torque than the other two motors 310A, 310C.

The gimbal 300 also may couple mechanically to a mount platform via a mechanical attachment portion 370. The mechanical attachment portion 370 may be part of the base arm 320. The mechanical attachment portion 370 may include a mechanical locking mechanism to securely attach to a reciprocal component on a mount platform (e.g., an aerial vehicle, a ground vehicle, an underwater vehicle, or a handheld grip). The example mechanical locking mechanism shown in FIGS. 3A and 3B includes a groove with a channel in which a key (e.g., a tapered pin or block) on a reciprocal component on a mount platform can fit. The gimbal 300 can be locked with the mount platform in a first position and unlocked in a second position, allowing for detachment of the gimbal 300 from the mount platform. The mechanical attachment portion 370 may connect to a reciprocal component on a mount platform in which the mechanical attachment portion 370 is configured as a female portion of a sleeve coupling and in which the mount platform is configured as a male portion of a sleeve coupling.

In some embodiments, the gimbal 300 includes a mount connector 380 which allows the gimbal 300 to electronically couple to a mount platform. The mount connector 380 may include a power connection which provides power from the mount platform to the gimbal 300 and/or the camera 350. The mount connector 380 may also allow communication between the gimbal 300 and the mount platform. In some embodiments, the mount connector 380 connects to the camera 350 via one or more data busses which allow communication between the mount platform and the camera 350. The gimbal 300 may include an internal bus which connects between the camera frame 355 and the mount connector 380 and allows for communication between the mount platform and the camera 350.

The camera 350 may be enclosed or mounted to a camera frame 355. The camera frame 355 may include electronic connectors which can couple with the corresponding camera 350. The camera frame 355 may include, for example, a micro USB connector, which can provide power to the camera 350 and can allow the mount platform (e.g., an aerial vehicle) to send executable instructions to the camera 350, such as a command to change the frame rate of a video, or take a picture. The camera frame 355 may also include a video interface connector (e.g., a High-Definition Multimedia Interface (HDMI) connector), which may allow the camera to transmit captured video, audio, and images to the mount platform. The camera frame 355 may include any set of connectors and utilize any communication protocols to transmit data to and from the mount platform. The camera frame 355 may include a set of connectors which connect to the gimbal 300, so that the gimbal 300 can act as a bus for transmitting data or power between the mount platform and the camera 350, and vice versa.

Example Aerial Vehicle

Figure 4:
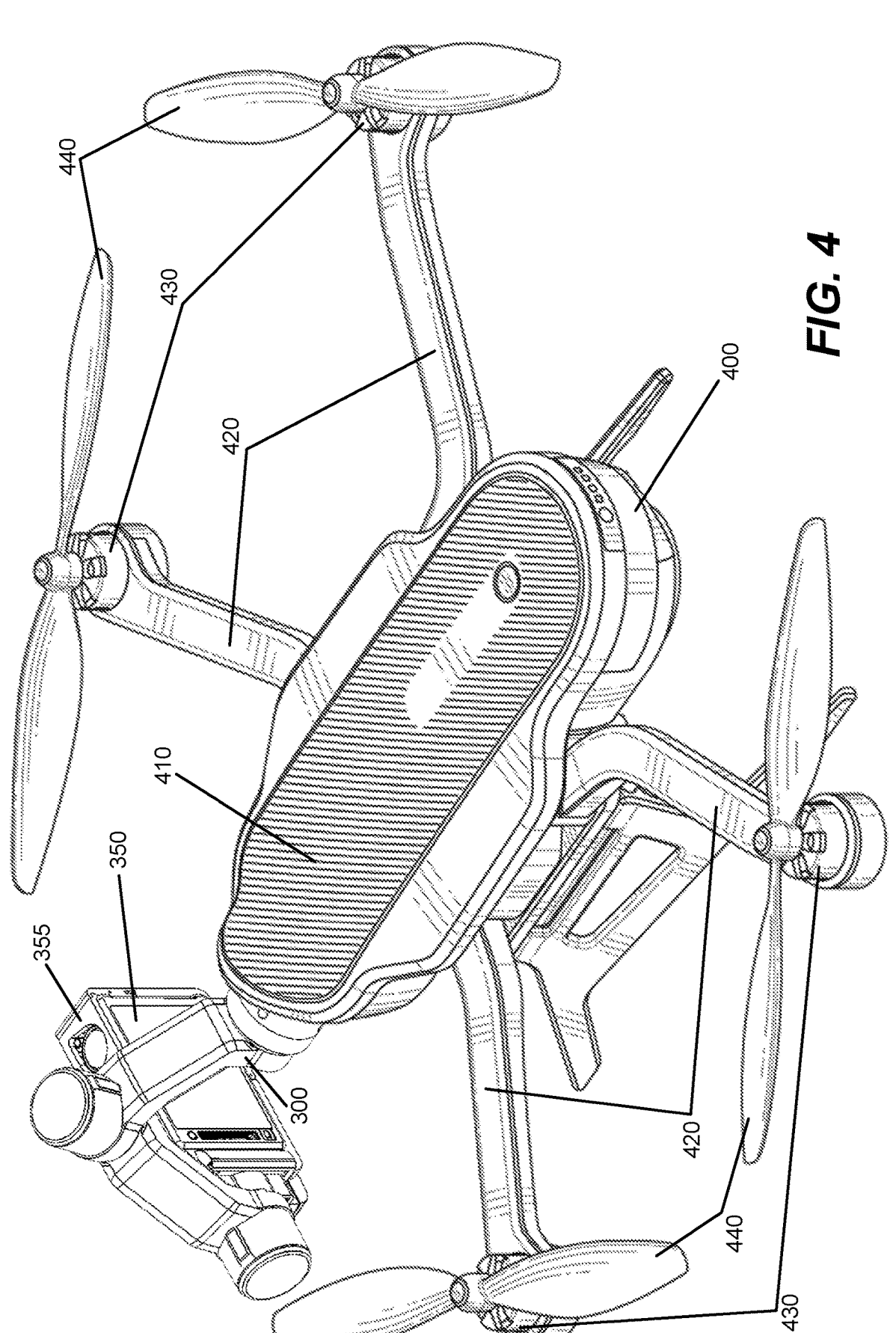
FIG. 4 is an example of a gimbal and a camera mounted on an aerial vehicle, in accordance with some example embodiments.

FIG. 4 is an example of a gimbal and a camera mounted on an aerial vehicle, in accordance with some embodiments. The aerial vehicle 400 in this example is shown with a housing 410 and four arms 420. The housing 410 may enclose a payload (e.g., electronics, storage media, and/or camera). A thrust motor 430 may be coupled with the end of each arm 420, and a respective propeller 440 may be coupled to each thrust motor 430. The thrust motors 430 may spin the propellers 440 when the thrust motors 430 are operational. When the thrust motors 430 are operational, all the propellers 440 may spin at appropriate speeds to allow the aerial vehicle 400 to lift (take off), land, hover, move (e.g., forward, backward), and rotate in flight. Modulation of the power supplied to each of the thrust motors 430 may control the trajectory and torque on the aerial vehicle 400. The aerial vehicle 400 may be coupled to a gimbal 300, a camera frame 355, and a camera 350.

The gimbal 300 may be coupled to the housing 410 of the aerial vehicle 400 through a removable coupling mechanism that mates with a reciprocal mechanism on the aerial vehicle 400 having mechanical and communicative capabilities. In some embodiments, the gimbal 300 may be attached or removed from the aerial vehicle 400 without the use of tools. The gimbal 300 may control the position and/or orientation of the camera 350.

Example Camera Architecture

Figure 5:
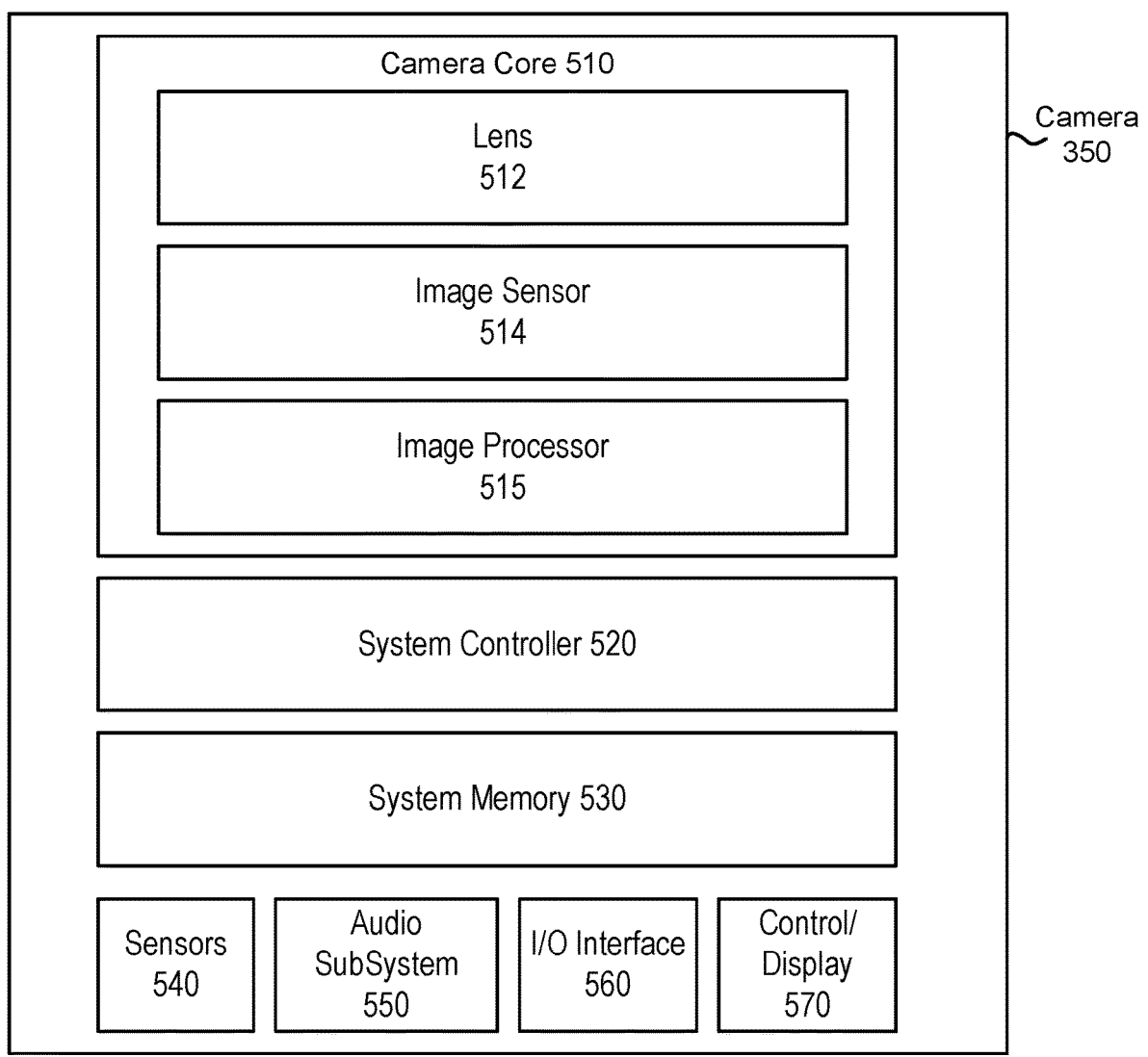
FIG. 5 illustrates an example architecture for a camera in accordance with an example embodiment.

FIG. 5 illustrates a block diagram of an example camera architecture. The camera architecture 505 corresponds to an architecture for a camera, e.g., camera 350. In one embodiment, the camera 350 is capable of capturing spherical or substantially spherical content. As used herein, spherical content may include still images or video having spherical or substantially spherical field of view. For example, in one embodiment, the camera 350 captures video having a 360° field of view in the horizontal plane and a 180° field of view in the vertical plane. Alternatively, the camera 350 may capture substantially spherical images or video having less than 360° in the horizontal direction and less than 180° in the vertical direction (e.g., within 10% of the field of view associated with fully spherical content). In other embodiments, the camera 350 may capture images or video having a non-spherical wide angle field of view.

As described in greater detail below, the camera 350 may include sensors 540 to capture metadata associated with video data, such as timing data, motion data, speed data, acceleration data, altitude data, GPS data, and the like. In a particular embodiment, location and/or time centric metadata (geographic location, time, speed, etc.) can be incorporated into a media file together with the captured content in order to track the location of the camera 350 over time. This metadata may be captured by the camera 350 itself or by another device (e.g., a mobile phone or the aerial vehicle 400) proximate to the camera 350. In one embodiment, the metadata may be incorporated with the content stream by the camera 350 as the content is being captured. In another embodiment, a metadata file separate from the video file may be captured (by the same capture device or a different capture device) and the two separate files can be combined or otherwise processed together in post-processing. These sensors 540 can be in addition to sensors in a telemetric subsystem of the aerial vehicle 400. In embodiments in which the camera 350 is integrated with the aerial vehicle 400, the camera need not have separate individual sensors, but rather could rely upon the sensors integrated with the aerial vehicle 400.

In the embodiment illustrated in FIG. 5, the camera 350 includes a camera core 510 comprising a lens 512, an image sensor 514, and an image processor 515. The camera 350 additionally includes a system controller 520 (e.g., a microcontroller or microprocessor) that controls the operation and functionality of the camera 350 and system memory 530 configured to store executable computer instructions that, when executed by the system controller 520 and/or the image processors 515, perform the camera functionalities described herein. In some embodiments, a camera 350 may include multiple camera cores 510 to capture fields of view in different directions which may then be stitched together to form a cohesive image. For example, in an embodiment of a spherical camera system, the camera 350 may include two camera cores 510 each having a hemispherical or hyper hemispherical lens that each captures a hemispherical or hyper hemispherical field of view which are stitched together in post-processing to form a spherical image.

The lens 512 can be, for example, a wide angle lens, hemispherical, or hyper hemispherical lens that focuses light entering the lens to the image sensor 514 which captures images and/or video frames. The image sensor 514 may capture high-definition images having a resolution of, for example, 720p, 1080p, 4 k, or higher. In one embodiment, spherical video is captured in a resolution of 5760 pixels by 2880 pixels with a 360° horizontal field of view and a 180° vertical field of view. For video, the image sensor 514 may capture video at frame rates of, for example, 30 frames per second, 60 frames per second, or higher. The image processor 515 performs one or more image processing functions of the captured images or video. For example, the image processor 515 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 530 and/or to a non-volatile storage, which may be in the form of internal storage or an external memory card.

An input/output (I/O) interface 560 may transmit and receive data from various external devices. For example, the I/O interface 560 may facilitate the receiving or transmitting video or audio information through an I/O port. Examples of I/O ports or interfaces include USB ports, HDMI ports, Ethernet ports, audio ports, and the like. Furthermore, embodiments of the I/O interface 560 may include wireless ports that can accommodate wireless connections. Examples of wireless ports include Bluetooth, Wireless USB, Near Field Communication (NFC), and the like. The I/O interface 560 may also include an interface to synchronize the camera 350 with other cameras or with other external devices, such as a remote control, a second camera, a smartphone, a client device, or a video server.

A control/display subsystem 570 may include various control and display components associated with operation of the camera 350 including, for example, LED lights, a display, buttons, microphones, speakers, and the like. The audio subsystem 550 may include, for example, one or more microphones and one or more audio processors to capture and process audio data correlated with video capture. In one embodiment, the audio subsystem 550 may include a microphone array having two or microphones arranged to obtain directional audio signals.

The sensors 540 may capture various metadata concurrently with, or separately from, video capture. For example, the sensors 540 may capture time-stamped location information based on a global positioning system (GPS) sensor, and/or an altimeter. Other sensors 540 may be used to detect and capture orientation of the camera 350 including, for example, an orientation sensor, an accelerometer, a gyroscope, or a magnetometer. Sensor data captured from the various sensors 540 may be processed to generate other types of metadata. For example, sensor data from the accelerometer may be used to generate motion metadata, comprising velocity and/or acceleration vectors representative of motion of the camera 350. Furthermore, sensor data from the aerial vehicle 400 and/or the gimbal 300 may be used to generate orientation metadata describing the orientation of the camera 350. Sensor data from a GPS sensor can provide GPS coordinates identifying the location of the camera 350, and the altimeter can measure the altitude of the camera 350. In one embodiment, the sensors 540 are rigidly coupled to the camera 350 such that any motion, orientation or change in location experienced by the camera 350 is also experienced by the sensors 540. The sensors 540 furthermore may associates a time stamp representing when the data was captured by each sensor. In one embodiment, the sensors 540 automatically begin collecting sensor metadata when the camera 350 begins recording a video.

Additional Considerations

The disclosed configuration describes an electronic motor with two bearings. The motor may be structured so that, when loaded, the majority of the load (e.g., a radial load) is borne by one of the bearings. The bearing that bears a greater load may be larger and, thus, better suited for a heavy load. In some embodiments, the larger bearing may include rolling elements that have respective radii larger than respective radii of rolling elements of the other bearing by a ratio of at least 1.5 (150%). In some embodiments, the larger bearing may have an outer race with a radius that is greater than a radius of the outer race of the smaller bearing by a ratio of at least 1.5. In some embodiments, the motors may include a third bearing between the two bearings. The third bearing may reduce vibration in the motor. Further, the disclosed configuration increases gimbal reliability, increases mounting options on the shaft, reduces weight, and provides stiffer joints, which may further assist with stability and higher resonance for control system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed motor. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An aerial vehicle comprising:
   a first arm;
   a motor comprising:
     a motor shell;
     a rotor located within the motor shell, the motor configured to rotate the rotor;
     a fixed component comprising:
       a mount located within the motor shell and coupled to a portion of the first arm that is located in the motor shell; and
       a stator coupled to the mount;
     a first bearing located between and connecting the rotor to the stator; and
     a second bearing located between and connecting the rotor to the mount,
     wherein the fixed component is mutually coupled to the first arm.

2. The aerial vehicle of claim 1, wherein:
   the first bearing comprises:
     a first inner race that is connected to the rotor; and
     a first outer race that is connected to the stator, wherein a first plurality of rolling elements are located between the first inner race and the first outer race so that the first inner race and the first outer race are configured to move relative to one another, and
   the second bearing comprises:
     a second inner race that is connected to the rotor; and
     a second outer race that is connected to the mount, wherein a second plurality of rolling elements are located between the second inner race and the second outer race so that the second inner race and the second outer race are configured to move relative to one another.

3. The aerial vehicle of claim 1, further comprising:

a first plurality of rolling elements located in the first bearing; and a second plurality of rolling elements located in the second bearing, wherein the first plurality of rolling elements and the second plurality of rolling elements are a spherical ball or a cylindrical element.

4. The aerial vehicle of claim 1, further comprising:

a third bearing connected to the rotor and the mount, and wherein the third bearing is located between the first bearing the second bearing.

5. The aerial vehicle of claim 3, wherein a third bearing includes a third plurality of rolling elements, and wherein a respective radii of the second plurality of rolling elements are larger than a respective radii of the third plurality of rolling elements by a ratio of at least 1.5.

6. The aerial vehicle of claim 4, wherein the third bearing includes a third plurality of rolling elements, and wherein a respective radii of a first plurality of rolling elements and the respective radii of the third plurality of rolling elements differ by a factor of 0.1 or less.

7. The aerial vehicle of claim 1, wherein the motor shell includes a first motor shell and a second motor shell.

8. The aerial vehicle of claim 7, further comprising:

a rotor screw connecting the second motor shell to the rotor.

9. The aerial vehicle of claim 1 further comprising:

a motor shell that couples to the mount and houses the stator, the first and second bearings, and at least a portion of the rotor.

10. An aerial vehicle comprising:

a motor comprising:

a motor shell;

a rotor located within the motor shell, the motor configured to rotate the rotor;

a fixed component comprising:

a mount; and a stator connected to the mount;

a first bearing including:

a first inner race in communication with the rotor, a first outer race in communication with the stator, and a first plurality of rolling elements located between the first inner race and the first outer race; and a second bearing including:

a second inner race in communication with the rotor, a second outer race in communication with the mount, and a second plurality of rolling elements located between the second inner race and the second outer race; and a first arm having a portion located in the motor shell that connects to the mount;

wherein the fixed component is coupled to and fixed relative to the portion of the first arm located in the motor shell.

11. The aerial vehicle of claim 10, wherein the first plurality of rolling elements and the second plurality of rolling elements are spherical balls or cylindrical elements.

12. The aerial vehicle of claim 10, further comprising:

a third bearing including:

a third inner race connected to the rotor, a third outer race connected to the mount, and a third plurality of rolling elements located between the third inner race and the third outer race.

13. The aerial vehicle of claim 12, wherein the third bearing is located between the first bearing and the second bearing.

14. The aerial vehicle of claim 12, wherein a radius of the second outer race is greater than a radius of the third outer race by a ratio of at least 1.5.

15. The aerial vehicle of claim 12, wherein a radius of the second outer race and a radius of the third outer race differ by a factor of 0.1 or less.

16. The aerial vehicle of claim 10, wherein the motor shell comprises:

a first motor shell; and a second motor shell, wherein the first motor shell is connected to the mount.

17. The aerial vehicle of claim 16, wherein one or more screws connect the first motor shell to the mount.

18. An aerial vehicle comprising:

a motor comprising:

a first motor shell;

a second motor shell, wherein the first motor shell and the second motor shell form an interior cavity;

a rotor configured to be a rotational part of the motor;

a fixed component comprising:

a mount located within the interior cavity;

a stator coupled to the mount; and one or more screws connecting the first motor shell to the mount;

a first bearing located between and connecting the rotor to the stator; and a second bearing located between and connecting the rotor to the mount, a first arm comprising a portion located in the interior cavity and coupled to the mount;

wherein the fixed component is coupled to the portion of the first arm located within the interior cavity.

19. The aerial vehicle of claim 18, further comprising:

a rotor screw connecting the second motor shell to the rotor.

20. The aerial vehicle of claim 18, wherein the first motor shell is connected to the mount.

* * * * *